United States Patent Office 3,407,259
Patented Oct. 22, 1968

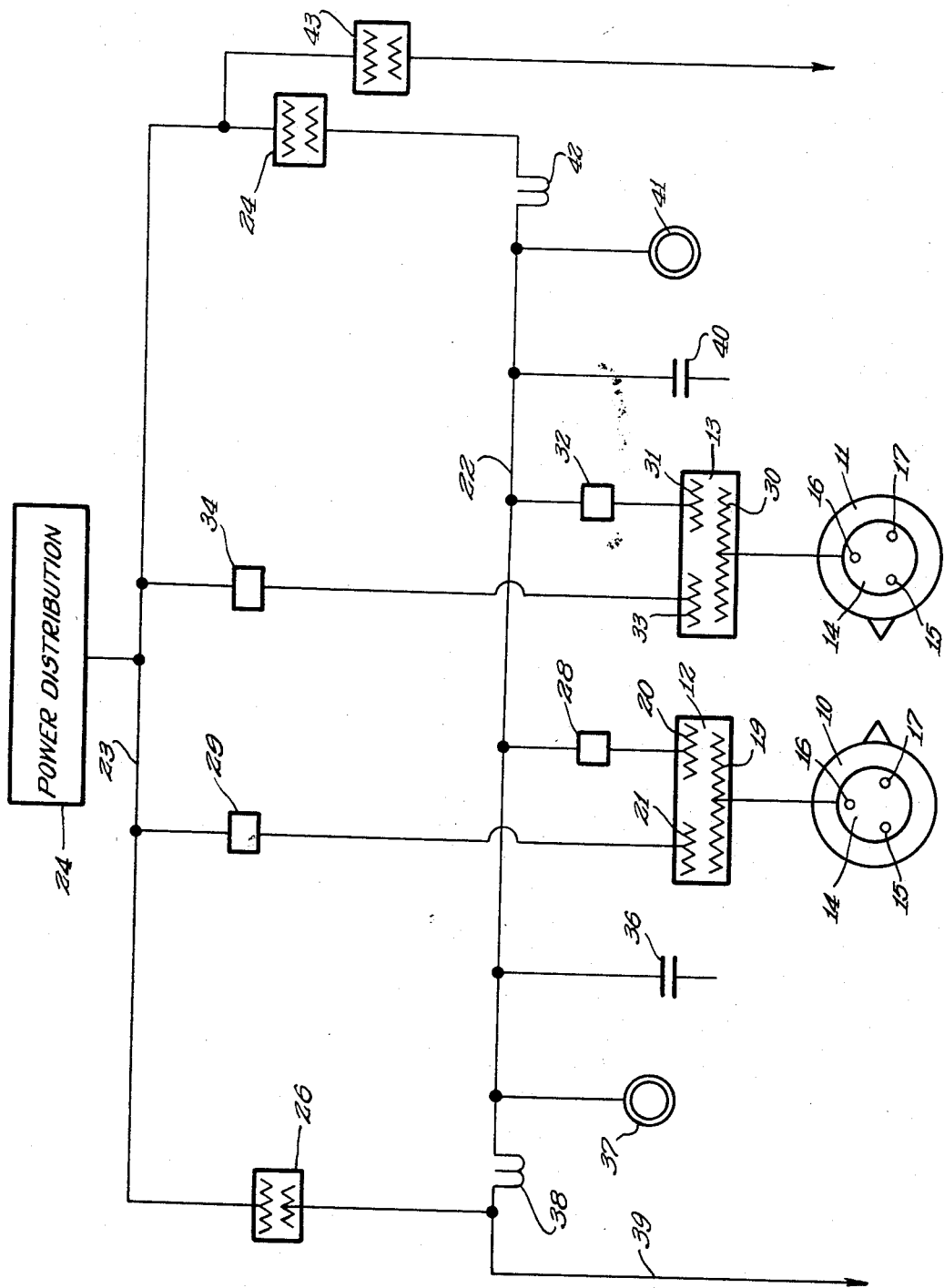

3,407,259
METHOD OF OPERATING AN ELECTRIC FURNACE WHEREIN THE ARC POWER IS INCREASED ABOVE 50 MVA. AFTER THE CHARGE HAS BEGUN TO MELT
Charles G. Robinson, Sterling, Ill., assignor to Northwestern Steel and Wire Company, Sterling, Ill., a corporation of Illinois
Filed Apr. 29, 1966, Ser. No. 546,266
1 Claim. (Cl. 13—34)

ABSTRACT OF THE DISCLOSURE

A method using an electric arc to melt metal wherein an arc of given power is established between electrodes and the metal and, after the metal has begun to melt the power to the arc is increased.

---

This invention relates generally to a method and apparatus for melting metal, and has particular utility when used for the production of low carbon steel. More specifically, the present invention provides means whereby an ultra-high power electric arc is delivered to a steel furnance to melt the charge therein.

Electric arc furnaces for the production of steel in which a charge of metal is melted by direct arcs between a series of electrodes and the charge, have become relatively well known in the art. Such furnaces are commonly available in sizes having a power rating of 25,000 kva. As the technology of producing high quality low carbon steel increases, so also does the demand for such steel. One approach to increased productivity of low carbon steel is to increase the number of furnaces used in the manufacture of such steel. However, the production of low carbon steel is a highly competitive operation and it is desirable to not only increase the productivity of steel but also to increase the efficiency of the apparatus used to produce such steel.

Therefore, one of the objects of the present invention, particularly from a manufacturing standpoint, is to provide means which will decrease the melting time of steel scrap, thereby increasing productivity of a direct arc melting furnance.

Another object of the present invention is to provide an electric direct arc melting furnance with means which will develop an electric arc which has a power rating in excess of 50 mva.

Another object of the present invention is to provide means whereby an electric arc furnace can be constructed having a capacity of 300 to 1,000 metric tons.

Another object of the present invention is to provide means whereby existing electric arc furnaces can be capable of producing larger quantities of steel.

Another object of the present invention is to provide an ultra-high power direct eelctric arc furnace for the manufacture of low carbon steel.

A feature of the present invention is to supply power to a direct arc melting furnace by a transformer having a single secondary winding and a pair of primary windings which are connected to voltage supply sources of different magnitude.

Another feature of the present invention is the use of a transformer having a pair of primary windings connected to separate voltage sources of different magnitude which gives the advantage that should one or the other of the primary windings or voltage supplies connected thereto become inoperative, the other primary winding and/or voltage supply is sufficiently large to maintain operation of the electric arc furnace.

As used throughout the specification and claims, the term "ultra-high power" is used to qualify the level of power input to the furnace in comparison to other lower-powered furnaces, used in the production of carbon steel. The term commonly used in the art for high-powered electric arc furnaces is used to define electric arc furnaces have a power rating between 40,000 and 50,000 kva. The present invention provides means whereby an electric arc furnace can be operated within a power range of 74,000 to 82,000 kva. and is therefore termed ultra-high power. Therefore, throughout the specification and claims, the term "ultra-high power" is used to define power ratings in excess of 50,000 kva.

Briefly, the present invention provides a method whereby steel is melted in a direct arc electric furnace by first initiating an arc within the furnace between the electrodes and the charge having a power rating less than 50 mva., and subsequently increasing the power rating of the arc to more than 50 mva., after melting has started. This improved operation is accomplished by the use of a transformer having a plurality of primary windings connected to respective different power sources of different magnitude. For example, one of the primary windings is connected to a primary power source having a voltage of 138 kilovolts and the other primary winding is connected to a secondary power source, or substation, having a power rating of 13.8 kilovolts. Suitable switch means is connected between each of the primary windings and their respective power sources so as to selectively connect and disconnect the power sources from the primary windings. For example, the low-voltage power source may be connected to one of the primary windings to establish and maintain an arc within the furnace until the charge therein begins to melt. At some time after the charge has begun to melt, the low-voltage power source may be disconnected from its associated primary winding and the high-voltage power source connected to its associated primary winding, thereby substantially increasing the power delivered to the electric arc furnace.

The single figure shows a one-line diagram of the novel arrangement of the power system of the present invention. One-line diagrams of this type are relatively common in the art when illustrating a power system of high magnitude.

As shown on the drawing, a pair of electric arc furnaces 10 and 11, which may be of the direct arc type, are connected to a pair of transformers 12 and 13, respectively. The electric arc furnaces 10 and 11 are each provided with an electrode holder 14 which, in turn, supports a plurality of electrodes 15, 16 and 17. The electrodes 15–17 may be constructed of carbon or other suitable electrode material and disposed within the electrode holder in a delta arrangement, approximately 120° from one another. In some instances, however, it may be desirable to dispose the electrodes within the electrode holder in alignment with one another depending upon the interior shape of the furnace.

The transformer 12 has a secondary winding 19 which is electrically connected to the electrodes 15–17 of the furnace 10. A pair of primary windings 20 and 21 are connected to a low-voltage line 22 and a high-voltage line 23, respectively. By way of example, the high-voltage line 23 may be connected to a primary power supply source 24 which delivers 138 kilovolts, and the low-voltage line may be connected to a pair of substations 26 and 27 which deliver 13.8 kilovolts.

The primary winding 20 is selectively connected to the low-voltage line 22 by a switching device 28, and the primary winding 21 is selectively connected to the high-voltage line 23 by a switching device 29.

The transformer 13 has a secondary winding 30 which is connected to the electrodes 15–17 of the electric are furnace 11. A primary winding 31 is selectively connected to the low-voltage line 22 by a switching device 32. Similarly, a primary winding 33, of the transformer 13, is selectively connected to the high-voltage line 23 by a switching device 34.

A capacitor 36 is connected to the low-voltage line 22 and is associated with the electric arc furnace 10. The capacitor 36 may have a rating of 20 mva. Also connected to the low-voltage line 22 is a synchronous condenser 37 which may have a power rating of 25 mva. A reactor 38 is connected between the substation 26 and the low-voltage line 22 and may have an impedance of 0.5 ohm. Also, the substation 26 may provide power to other machinery such as rod and wire mills through a line 39.

Connected to the low-voltage line 22 is a capacitor 40 which is associated with the electric arc furnace 11. The capacitor 40 may have a power rating of 24 mva. Also connected to the low-voltage line 22 is a synchronous condenser 41 which has a power rating of 80 mva. A reactor 42 is connected between the low-voltage line 22 and the substation 27 and may have an impedance of 0.8 ohm.

It will be understood that other substations such as 43 may be connected to the primary power station 24 for supplying power to other machinery necessary for the production of steel. Although the preferred embodiment of the present invention shows only two electric arc furnaces 10 and 11, it is not to be construed in a limiting sense. Any number of electric arc furnaces may be connected according to the arrangement shown. To simplify the discussion of operation of electric arc furnaces which utilize the novel concept of this invention, only the furnace 10 will be discussed.

In operation:

The electric arc furnace 10 is charged with a supply of scrap metal which is to be melted and subsequently tapped and poured to form ingots of high quality, low carbon steel. After the furnace 10 has been charged, the switching device 28 is actuated to connect the low-voltage line 22 to the primary winding 20 of the transformer 12. This action will etsablish an arc of high intensity between the electrodes 15–17 and the scrap material within the furnace 10. The high intensity arc is continued until the scrap within the furnace begins to melt, or in some cases until the scrap within the furnace has partially melted.

At some predetermined time after the scrap within the furnace 10 begins to melt, the switching device 29 is actuated and the switching device 28 is deactuated. By connecting the high-voltage line 23 to the primary winding 21 of the transformer 12, the high intensity arc between the scrap material within the furnace 10 and the electrodes 15–17 is increased to an ultra-high intensity arc. In so increasing the power rating of the arc within the furnace, the melting time of the scrap therein is decreased, thereby increasing the efficiency of such electric arc furnaces.

Reactive power is supplied on location by the two synchronous condensers 37 and 41 and the static capacitors 36 and 40. Furthermore, buffer reactors 38 and 42 are provided in the low-voltage line to augment the reactance of the circuitry. The synchronous condensers may be of the rotating type which are encased in a hydrogen-filled enclosure. The output of the synchronous condensers is regulated by field excitation influenced by the operating currents of the furnace.

It may be seen from the foregoing that the present invention has provided an improved method and apparatus for the economical production of high quality, low carbon steel. It will also be understood that variations and modifications may be effected without departing from the spirit and scope of the novel concepts of this invention.

What is claimed is:
1. A method of melting metal comprising the steps of:
charging an electric furnace with the metal to be melted;
applying an electric arc of less than 50 mva. to the metal within the furnace to initiate melting of the metal, and
increasing the electric arc to more than 50 mva. after melting has started.

References Cited

UNITED STATES PATENTS

| | | | |
|---|---|---|---|
| 1,497,554 | 6/1924 | Dixon | 13—34 |
| 3,353,807 | 11/1967 | Sixel, et al. | 75—10 XR |

BERNARD A. GILHEANY, *Primary Examiner.*

R. N. ENVALL, JR., *Assistant Examiner.*